(12) United States Patent
Marcus et al.

(10) Patent No.: US 9,998,919 B1
(45) Date of Patent: Jun. 12, 2018

(54) SMS SPOOFING PROTECTION

(75) Inventors: Dror Michael Marcus, Tel Aviv (IL);
Aviad Barzilai, Haifa (IL); Brian Eaton, Mountain View, CA (US); Guy Flysher, Petah Tikva (IL); Mark A. Grossman, Rishon Lezion (IL); Shai Gutner, Modi'in (IL); Divon Mordechai Lan, Tel Aviv (IL); Michal Maor, Mazor (IL); Natalia Marmasse, Ichud (IL); Asaf Revach, Nordia (IL); Billy Kim Rios, San Jose, CA (US); Eran Werner, Hod Hasharon (IL)

(73) Assignee: Google LLC, Mountain View, CA (US)

( * ) Notice: Subject to any disclaimer, the term of this patent is extended or adjusted under 35 U.S.C. 154(b) by 988 days.

(21) Appl. No.: 13/361,192

(22) Filed: Jan. 30, 2012

Related U.S. Application Data

(60) Provisional application No. 61/561,376, filed on Nov. 18, 2011.

(51) Int. Cl.
*H04W 12/06* (2009.01)
*H04W 4/14* (2009.01)
*H04W 4/12* (2009.01)
*H04W 12/02* (2009.01)
*H04W 12/08* (2009.01)
*H04W 12/12* (2009.01)

(52) U.S. Cl.
CPC .......... *H04W 12/06* (2013.01); *H04W 4/12* (2013.01); *H04W 12/08* (2013.01); *H04W 12/12* (2013.01)

(58) Field of Classification Search
CPC ......... H04W 12/06; H04W 4/14; H04W 4/12; H04W 12/02; H04W 12/08; H04W 12/12

USPC .......... 455/411, 412.2, 414.1, 424, 425, 466, 455/412.1, 560; 709/201–253
See application file for complete search history.

(56) References Cited

U.S. PATENT DOCUMENTS

| | | | |
|---|---|---|---|
| 6,961,330 B1 * | 11/2005 | Cattan et al. | 370/352 |
| 7,296,156 B2 | 11/2007 | Marmigere et al. | |
| 7,890,084 B1 | 2/2011 | Dudziak et al. | |
| 2001/0034225 A1 * | 10/2001 | Gupte et al. | 455/412 |
| 2002/0129236 A1 * | 9/2002 | Nuutinen | 713/151 |
| 2004/0123158 A1 * | 6/2004 | Roskind | 713/202 |
| 2005/0177875 A1 * | 8/2005 | Kamperman et al. | 726/27 |
| 2006/0005033 A1 | 1/2006 | Wood | |
| 2006/0019634 A1 * | 1/2006 | Hawkes | 455/411 |
| 2006/0036868 A1 * | 2/2006 | Cicchitto | 713/182 |
| 2006/0265243 A1 * | 11/2006 | Racho | G06Q 20/32 705/35 |
| 2007/0133602 A1 * | 6/2007 | Russell | 370/467 |
| 2009/0111424 A1 * | 4/2009 | Bengtsson et al. | 455/411 |
| 2009/0125992 A1 | 5/2009 | Larsson et al. | |
| 2009/0198664 A1 * | 8/2009 | Hamilton et al. | 707/4 |

(Continued)

*Primary Examiner* — Dinh P Nguyen
(74) *Attorney, Agent, or Firm* — Shumaker & Sieffert, P.A.

(57) ABSTRACT

A method for establishing credentials for securing text message communications. The method includes receiving, at a text messaging hub executing at a server device, a text message from a user, the text message being directed to a service number and including (1) a user number and (2) a request to establish a secure credential for communicating with a text messaging application. The method also includes transmitting, by the text messaging hub executing at the server device, an initiation message to the user, the initiation message includes a user-specific system number to which the user is to direct future text messages.

26 Claims, 4 Drawing Sheets

(56) References Cited

U.S. PATENT DOCUMENTS

| | | |
|---|---|---|
| 2009/0257593 A1 | 10/2009 | Losovsky |
| 2009/0265552 A1 | 10/2009 | Moshir et al. |
| 2009/0282251 A1* | 11/2009 | Cook et al. .................. 713/171 |
| 2010/0002882 A1 | 1/2010 | Rieger et al. |
| 2010/0122327 A1* | 5/2010 | Linecker ................ H04L 63/08 726/6 |
| 2011/0238766 A1* | 9/2011 | Lew ................ H04L 29/12896 709/206 |
| 2011/0250909 A1* | 10/2011 | Mathias ............. H04M 7/0057 455/466 |

* cited by examiner

SMS SPOOFING PROTECTION

RELATED APPLICATIONS

The present application claims priority to U.S. Provisional Patent Application No. 61/561,376, filed Nov. 18, 2011, which is incorporated in its entirety herein by reference.

BACKGROUND

The currently described disclosure relates to use of service numbers to protect against text message spoofing (e.g., spoofing of Short Message Service (SMS) messages). Various software applications allow the exchange of SMS messages between users. During use of such software applications, a user is generally identified by his/her mobile phone number, which can appear in the "from" field of a text message header and thereby identify the origin of the text message (i.e., the sender's "user number"). Because some known methods of text messaging (e.g., SMS) are not fully secure, there is often no simple way to validate the origin of a text message. In some instances this security gap makes it possible for an individual to misrepresent (i.e., "spoof") the sender of a text message. In this manner, the unauthorized user is able to successfully send text messages that appear to come from a number not owned or controlled by the unauthorized user. A need therefore exists for improved methods and systems for protecting against text message spoofing.

SUMMARY

One embodiment features a method for establishing credentials for securing text message communications. The method includes receiving, at a text messaging hub executing at a server device, a text message from a user, the text message being directed to a service number and including (1) a user number and (2) a request to establish a secure credential for communicating with a text messaging application via the text messaging hub. The method also includes transmitting, by the text messaging hub executing at a server device, an initiation message including a user-specific system number to which the user is to direct future text messages.

In some embodiments, wherein the user-specific system number is a first user-specific system number and the method includes sending, by the text messaging hub executing at a server device, a notification text message instructing use of a newly-assigned (e.g., second) user-specific system number. In some embodiments, the initiation message is directed to the user at the user number. In some embodiments, the initiation message is sent to the user at a pre-approved e-mail address, a web portal software application, or other secure communication form associated with the user, and wherein the initiation message instructs use of a second, newly-assigned user-specific system number when sending subsequent text messages.

Another embodiment features a system for establishing credentials for securing text message communications. The system includes, a processor and a memory, the memory including code representing instructions that when executed cause the processor to receive, from a user, a text message directed to a service number, where the text message includes (1) a user number and (2) a request to establish a secure credential for communicating with a text messaging application. The instructions when executed also cause the processor to transmit an initiation message to the user, where the initiation message includes a user-specific system number to which the user is to direct future text messages.

In some embodiments, the processor includes a receiver module for receiving the text message and a transmitter module for transmitting the initiation message, where one or both of the receiver module and transmitting module are a component of a text messaging hub executing a server device. In some embodiments, the processor is configured to send a notification text message to the user from the first, user-specific system number, where the notification text message includes instructions to the user to use a second, newly-assigned user-specific system number. In some embodiments, the processor is configured to send the initiation message to the user at the user number. In some embodiments, the processor is configured to send the initiation message to the user at a pre-approved e-mail address, a web portal software application, or other communication form associated with the user instructing use of a second, newly-assigned user-specific system number when sending subsequent text messages.

Another embodiment features a method for authenticating a text message sent by a text messaging system to a text messaging application. The method includes receiving, at a text messaging hub executing at a server device, a text message from a user, the test message directed to a specific number associated with the text messaging hub, where the specific number is one of a plurality of possible numbers associated with the text messaging hub, where the text message includes a user number. The method also includes determining, by the text messaging hub executing at a server device, if the text message is authentic based on whether the user number is associated with the specific number based on a set of authorized user number/specific number pairs.

In some embodiments, the authorized user number/specific number pairs are stored in a memory operatively coupled to the server device. In some embodiments, the specific number of the user number/specific number pair is calculated by the text messaging hub using a hash method based on the user number and a key. In some embodiments, the method includes authenticating the text message if the user number is associated with the specific number. In some embodiments, the method includes forwarding the text message to a text messaging application in response to determining the text message is authentic. In some embodiments, the method includes not authenticating the text message if the user number is not associated with the specific number. In some embodiments, the method includes determining the text message is not authentic if the user number is not associated with the specific number. In some embodiments, the method includes, in response to determining the text message is not authentic, sending a notification text message to the user at the user number in response to not authenticating the text message.

In some embodiments, the notification text message includes information instructing the user to direct text messages to the user-specific system number. In some embodiments, the notification text message includes information instructing the user a non-authenticated text message purporting to be from the user was sent to the text messaging hub. In some embodiments, the method includes, in response to determining the text message is not authentic, sending a notification text message to the user at the user number in response to not authenticating the text message, where the notification text message includes a second, newly-assigned user-specific system number. In some embodiments, the method includes, in response to determining the text message is not authentic, sending to the user, by the text messaging hub executing at the server device, a notification indicating a third party may be attempting to spoof the users account in response to receiving non-authenticated text messages that do not satisfy a criterion. In some embodiments, determining the text message is not authentic based at least in part on a rate limiting criterion and the text messaging hub send the notification when a quantity of non-authenticated text messages directed to the user exceeds a predetermined threshold. In some embodiments, the step of determining if the text message is authentic includes determining whether a personal identification number (PIN) is included in the text message.

Another embodiment features a system for authenticating a text message sent by a text messaging system to a text messaging application. The system includes a processor and a memory, the memory including code representing instructions that when executed cause the processor to receive, from a user, a text message directed to a specific number associated with a text messaging hub, where the specific number is one of a plurality of possible numbers associated with the text messaging hub, and the text message includes a user number. The instructions when executed also cause the processor to determine whether the text message is authentic based at least in part on whether the user number is associated with the specific number based on a set of authorized user number/specific number pairs.

In some embodiments, the authorized user number/specific number pairs are stored in the memory. In some embodiments, the specific number of the user number/specific number pair is calculated by using a hash method based on the user number and a key. In some embodiments, the processor includes a receiver module for receiving the text message and an authentication module for determining whether the text message is authentic, where one or both of the receiver module and transmitting module are a component of the text messaging hub. In some embodiments, the code further represents instructions to cause the processor to authenticate the text message when the user number is associated with the specific number. In some embodiments, the code further represents instructions to cause the processor to forward the text message to a text messaging application when the text message is determined to be authentic. In some embodiments, the code further represents instructions to cause the processor to determine the text message is not authenticate when the user number is not associated with the specific number.

In some embodiments, the code further represents instructions to cause the processor to send a notification text message to the user at the user number when the text message is determined to not be authentic. In some embodiments, the notification text message includes information instructing the user to direct text messages to the user-specific system number. In some embodiments, the notification text message includes information instructing the user a non-authenticated text message purporting to be from the user was sent to the text messaging hub. In some embodiments, the code further represents instructions to cause the processor to send a notification text message to the user at the user number when the text message is determined to not be authentic, where the user-specific system number is a first user-specific system number and where the notification text message includes a second, newly-assigned user-specific system number. In some embodiments, the code further represents instructions to cause the processor to, in response to receiving multiple text messages that do not satisfy a predetermined criterion, send, to the user, a notification that a third party may be attempting to spoof an account of the user. In some embodiments, the criterion is a rate-limiting criterion and the code further represents instructions to cause the processor to send, to the user, a notification when a quantity of received, non-authenticated text messages directed to the user number exceed a predetermined threshold.

The text message credentialing systems and methods (hereinafter "technology") described herein can provide one or more of the following advantages. An advantage of the technology is that the use of system numbers makes it difficult for an unauthorized user/attacker to send text messages pretending to be an authorized user, thereby securing communication between the authorized user and third party application providers. Another advantage is that use of system numbers makes it difficult for an unauthorized user to guess the system number and pretend to be the authorized user.

Another advantage of the technology is that unauthorized users do not receive feedback when they attempt to send text messages because they are not aware of the proper system number assigned to the authorized user. Accordingly, the unauthorized user does not receive feedback that the text message has been dropped by the system. Another advantage of the technology is once the user has established credentials, the user does not need a password to interact with the software provider application. This allows for the user to securely communicate while using text messages.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Embodiments described use a user-specific system number which is difficult for an attacker/spoofer to guess, and known only to the real, authentic mobile user. The user's "user number" appears as the sending number in an SMS message header sent by the mobile user (e.g., the number appearing in the "from" field of an SMS message sent by the user). The SMS messages are sent according to the rules described below. When a user uses a mobile device to send an SMS message to a text messaging application, the user directs the SMS message to a specific destination number (a user-specific system number). The methods described are effective in preventing spoofing attacks because an attacker cannot know to which number he/she should send the spoofed SMS message.

Figure 1:
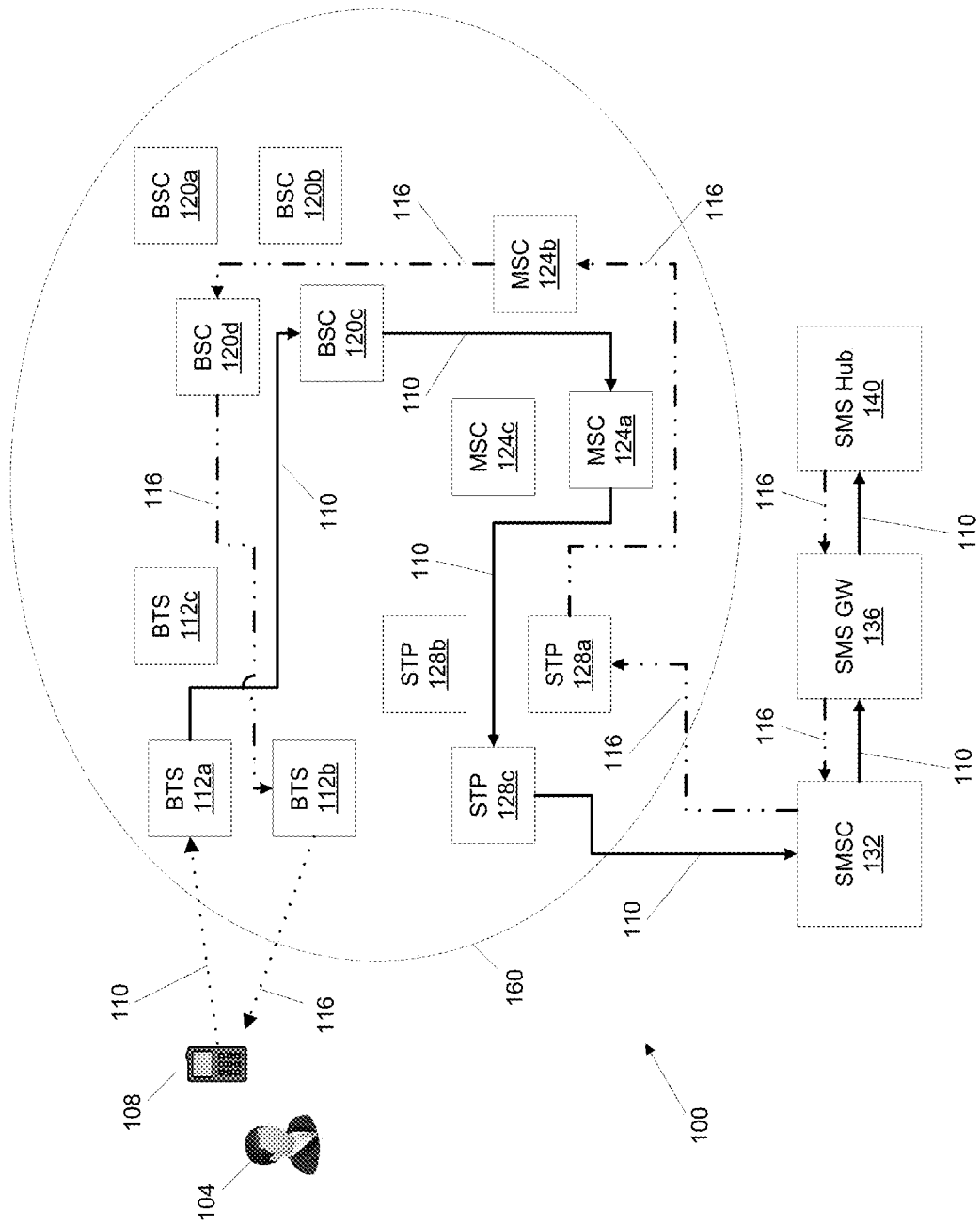
FIG. 1 is a system for establishing credentials for securing text message communications between a user and a text messaging application, according to an illustrative embodiment.

FIG. 1 is a system 100 for establishing credentials for securing text message communications between a user 104 using a mobile device 108 (e.g., cell phone with text messaging capability) and a text messaging application, according to an illustrative embodiment. Once the user has established credentials, the user does not need a password to interact with the text messaging application. The user does not need a password until the user wants to interact with the application via, for example, a web browser. For example, a user might utilize the methods and systems described herein for purposes of securing credentials to allow the user to send secure text messages to post information to the user's blog. The user 104 establishes credentials by sending a text message 110 to a text messaging hub 140 (executing at a server device) using a mobile communication network 160. The user 104 sends the text message 110 to a known system number. The text message may include instructions or additional text; however, it is not required. The text message can be an empty message, and sending the text message to the system is enough to initiate the authentication process. The system number could be a number that is known to the public so that any interested party could sign up for the authentication service offered by the provider.

In this embodiment, the communications network 160 is an SMS network and is configured as illustrated in FIG. 1; however, alternative networks have similar configurations and/or functionality. SMS messages include both header information as well as the message content the user is transmitting. The header information can include a plurality of fields (including, for example, length of message, service center identifier number, sender number, recipient number, time stamp).

In this embodiment, the network 160 includes a plurality of base transceiver stations 112a, 112b, and 112c (generally 112), a plurality of base station controllers 120a, 120b, 120c, and 120d (generally 120), a plurality of mobile switching centers 124a, 124b, and 124c (generally 124), and a plurality of single transfer points 128a, 128b, and 128c (generally 128). In this embodiment, the text message 110 is sent from the user's mobile device 108 through the air to base transceiver station 112a on a signaling channel of the network along with the address of a short message service center 132. The signaling channel is typically not encrypted. The text message 110 is received by the base transceiver station 112a and then sent to base station controller 120c. The medium used for communication between the base transceiver station 112a and the base station controller 120c varies (e.g., land-line or through the air) depending upon the operator and may or may not be encrypted.

The text message 110 is then passed from base station controller 120c to mobile switching center 124a. The mobile switching center 124a then passes the text message 110 to single transfer point 128c. The network 160 structure and configuration discussed herein is exemplary. Alternative structures and configurations can be used in other embodiments. For example, other exemplary systems might include several or no transfer points. The text message 110 is then passed from the single transfer point 128c to the short message service center 132 specified by the user 104 in the text message 110. The short message service center 132 determines if the text message 110 is intended to be directed to another user or an application.

In this embodiment, the text message 110 is intended to be directed to an application, and is then directed to an SMS gateway 136 using, for example, the short message peer to peer (SMPP) protocol, universal computer protocol (UCP) or hypertext transfer protocol (HTTP). In some embodiments, the SMS gateway is a component of the short message service center. The SMS gateway 136 is responsible for connecting the mobile network with other systems (for example, sending and receiving messages from other mobile operators or aggregators). In some instances, the base transceiver stations 112, base station controllers, mobile switching centers 124, single transfer points 128, short message service center 132, and SMS gateway 136 are located in the same building and the communication is secure. It is more difficult to guarantee communication security when they are not located together.

Figure 2:
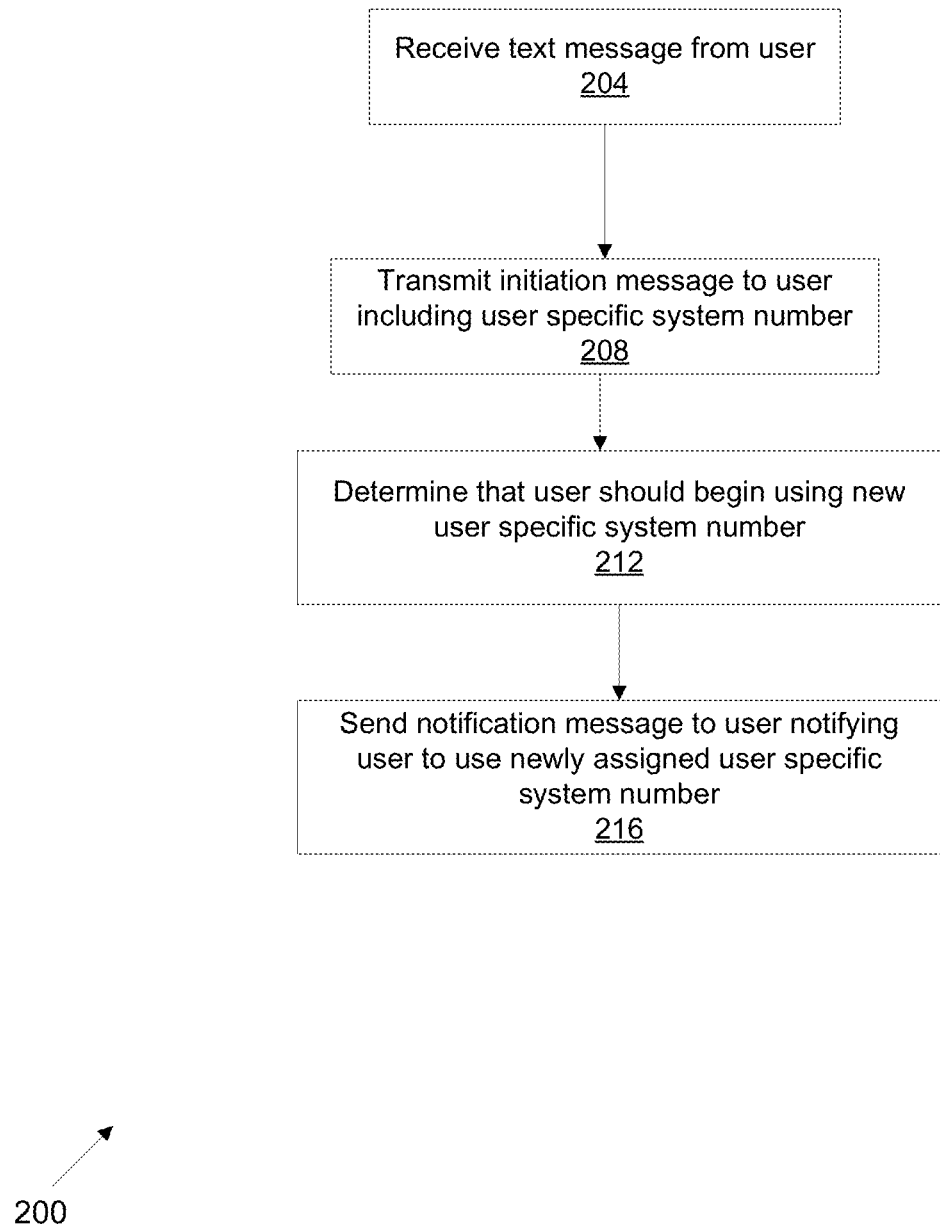
FIG. 2 is a flowchart of a method for establishing credentials for securing text message communications between a user and a text messaging application, according to an illustrative embodiment.

The system 100 then sends the text message to an SMS hub 140 for establishing credentials for securing future text message communication in accordance with, for example, the method of FIG. 2. The method includes receiving 204 a text message (e.g., message 110 of FIG. 1) from a user at a text messaging hub (e.g., SMS hub 140 of FIG. 1 executing at a server device) directed to a service number. The text message includes the user's user number and a request to establish a secure credential for communicating with a text messaging application via the text messaging hub. The request may include instructions or additional text; however, it is not required. The request can be an empty message, and sending the text message to the system is enough to request the secure credential.

There are a number of different ways the user could initially sign up or engage with the system so the system would be able to recognize the user. For example, the user can sign up for the service initially using his/her mobile device. The user might also create a user name at this time for the user's account. Alternatively, the user may already have an account (e.g., username and password) with the service provider. The user could then go to a setting page using a web portal and register his/her phone number (user number) for the authentication service. In both instances (and other embodiments), the system can, for example, map the user's username/credentials with the registered user number.

The method also includes transmitting an initiation message 208 to the user from the text messaging hub. The initiation message includes a user-specific system number (e.g., first user-specific system number) to which the user is to direct future text. Various methods can be used to allocate a particular user-specific system number to the user. In some cases, there is a pool of numbers available and the system selects the next number in the pool. In some cases, the system randomly (or pseudo-randomly) selects a number from the pool. In some cases, the system selects a number from the pool based on how many other users are using each of the numbers in the pool. In some embodiments, the initiation message also includes instructions that, for example, instruct the user to use the user-specific system number in future communications. Referring to FIG. 1, in this embodiment the initiation message 116 is sent to the user 104 via the following communication chain: SMS hub 140 to SMS gateway 136 to short message service center 132 to single transfer point 128a to mobile switching center 124b to base station controller 120d to base transceiver station 112b and then to the user's mobile device 108. In some embodiments, the initiation message is directed to the user at the user number. The initiation message can be a text message where a "to" field of the text message is the user number.

Referring to the method of FIG. 2, the method includes the optional step of determining 212 the user should begin using a new user-specific system number. This step might occur when, for example, the communication system (e.g., system 100 of FIG. 1 or system 300 of FIG. 3 determines an unauthorized entity is attempting to communicate with the SMS hub or a text messaging application by pretending to be the user (e.g., sending a text message that falsely indicates it is coming from the user)).

The method also includes sending a notification text message 216 to the user at the user-specific system number notifying the user to begin using a second, newly-assigned user-specific system number. The method may include sending the notification text message 216 if it is determined an unauthorized entity is attempting to communicate. In some embodiments, the initiation message is directed to the user at a pre-approved e-mail address, a web portal software application, subscriber identity module (SIM) application toolkit, or other communication form associated with the user instructing the user to begin using a second, newly-assigned user-specific system number when sending text messages. In instances where the user has already been authenticated, steps 212 and 216 may be performed while it is not necessary to perform step 208 again because no new authentication is required.

The embodiments described also may be used to authenticate and protect user communications in other forms. For example, users can also have system numbers associated with chat contact, e-mail contacts and other items ("other types of recipients"). If authenticated, text messages sent by the user to these numbers will be forwarded on to the other types of recipients.

Figure 3:
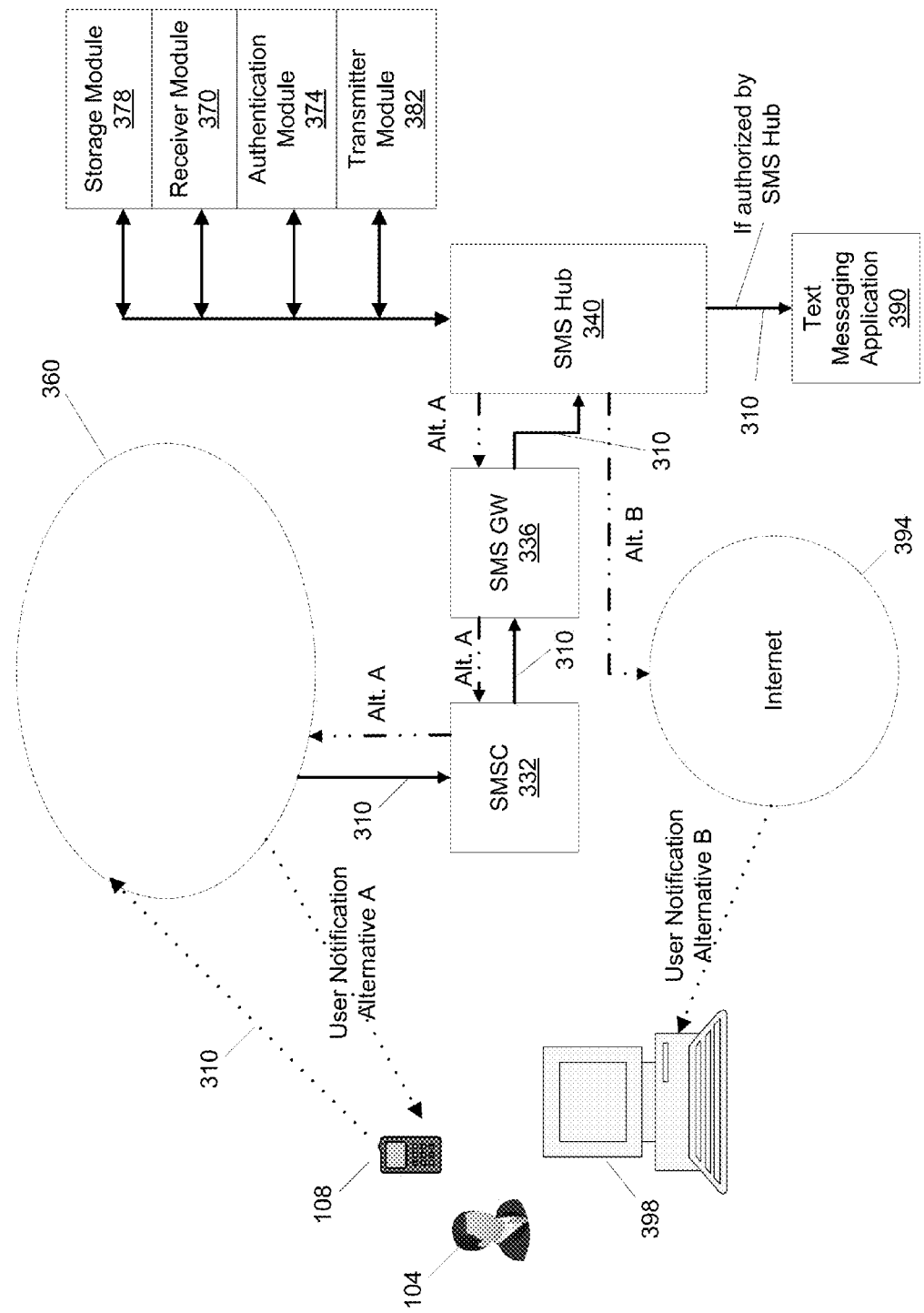
FIG. 3 is a system for authenticating a text message sent by a text messaging system to a text messaging application, according to an illustrative embodiment.

FIG. 3 is a system 300 for authenticating a text message 310 sent by a text messaging system to a text messaging application 390 once credentials have been established for the user, for example, similarly as described above with respect to FIGS. 1 and 2. The system handles communications between a user 104 using a mobile device 108 (e.g., cell phone with SMS messaging capability) and the text messaging application 390. The user 104 sends a text message 310 using a mobile communication network 360. In this embodiment, the communications network 360 is an SMS network and is configured as illustrated communications network 160 in FIG. 1. Alternative networks may be used in alternative embodiments. The text message 310 is then passed from the communications network 360 to a short message service center 332 specified by the user 104 in the text message 310. The short message service center 332 determines if the text message 310 is intended to be directed to another user or an application.

In this embodiment, the text message 310 is then directed to an SMS gateway 336 (and ultimately intended to be directed to the application text messaging application 390) using, for example, the short message peer to peer (SMPP) protocol. The system 300 then sends the text message 310 to a text messaging hub 340 (in this embodiment, an SMS hub executing at a sever device) for authenticating the text message 310 using, for example, the method of FIG. 4. The system 300 includes a receiver module 370 configured to receive the text message (which includes the user's user number) from the user 104 and is directed to a specific number associated with the text messaging hub 340. The specific number is one of a plurality of possible numbers associated with the text messaging hub 340. If the user is an authorized user, the user would properly send the text message to the first, user-specific system number previously provided to the user as described, for example, in FIGS. 1 and 2.

The system 300 includes a receiver module 370, authentication module 374, storage module 378 (including, for example, a memory that includes code representing instructions that cause a processor and/or the modules to perform the steps described herein) and a transmitter module 382. One or more of the modules can be a component of a processor running on the hub 340 or separately. One of more of the modules could be a component of the text messaging hub 340. In some embodiments, one or more of the modules are stand alone systems.

The authentication module 374 is configured to determine if the text message 310 is authentic (i.e., is a message sent by the real user associated with the user number) based on whether the user number is associated with the specific number based on a set of stored authorized user number/specific number pairs. In this embodiment, the user number/specific number pairs are stored in the storage module 378. In some embodiments, the specific number of the authorized user number/specific number pairs is not stored; rather, the specific number is calculated using a hash method based on the user number and a key. In some embodiments, the authentication module 374 is configured to authenticate the text message 310 if the user number is associated with the specific number and to fail authentication of the text message 310 if the user number is not associated with the specific number. The authentication module 374 could, for example, set a data flag to "authenticated" or to "not authenticated" for use by the system 300.

The transmitter module 382 is configured to transmit or send messages and notifications. In some embodiments, the transmitter module 382 is configured to forward the text message 310 to the text messaging application in response to authentication of the text message 310. In some embodiments, the transmitter module 382 is configured to send a notification message to the user 104 to the user 104 at the user number in response to failing authentication of the text message 310. Because the unauthorized user does not have access to the user-specific system number or the user number, the unauthorized user is unable to contact or interact with the text messaging application and also does not receive feedback informing him/her the text message has been dropped.

In this embodiment, two alternative notification methods are illustrated for notifying the user (Alternatives A and B); however, additional notification methods can be used to communicate with the user in alternative embodiments. Alternative A involves transmitting a notification message to the user 104 via the communications network 360 (from the text messaging hub 340 to the SMS gateway 336 to the short message service center 332 to the communications network 360 and then to the user 104 via the user's mobile device 108). Alternative B involves transmitting the notification message (Alt. B) from the text messaging hub 340 to the internet 394 and then to the user 104 at the user's computer 398. With Alternative B, the notification may be provided to the user 104 via a web portal application running on the computer 398.

Figure 4:
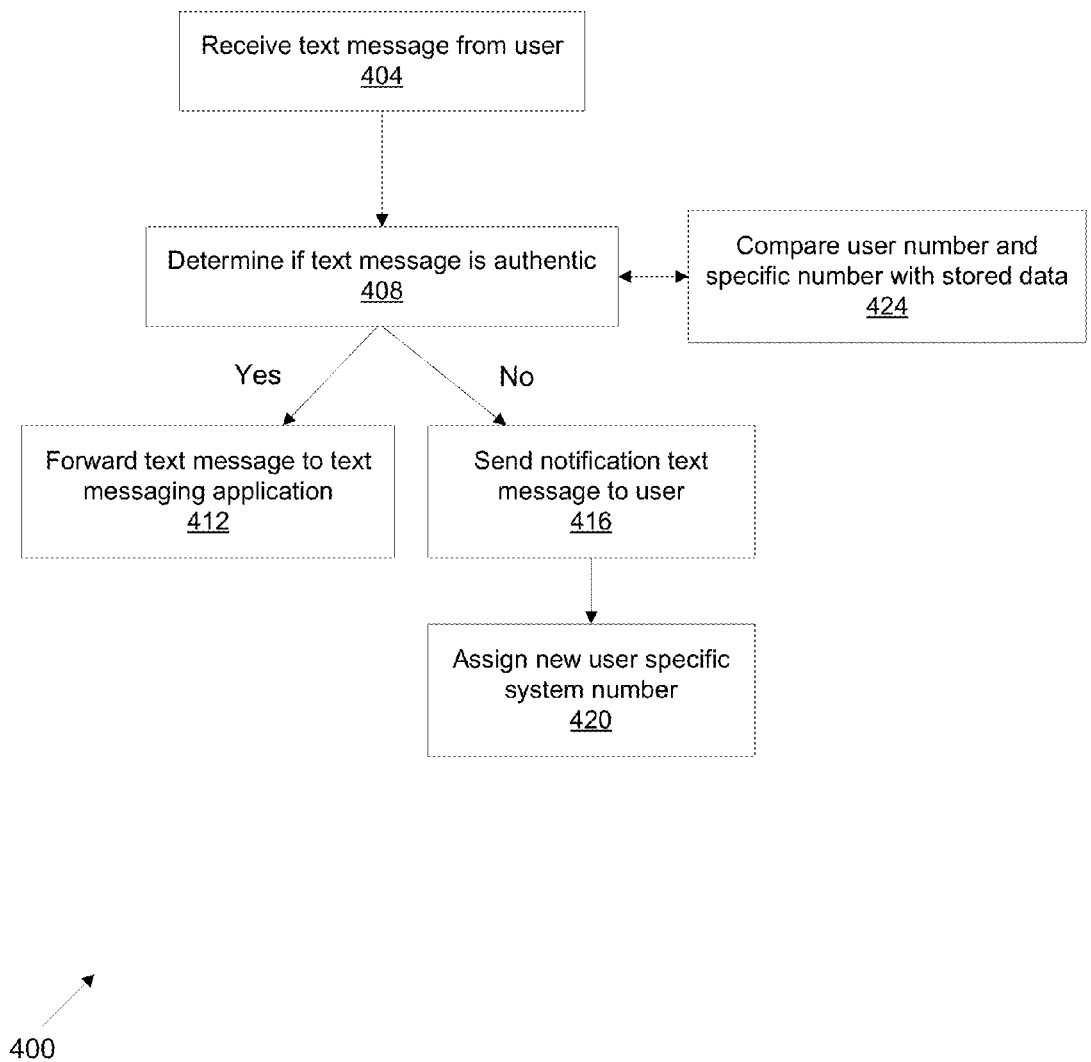
FIG. 4 is a flowchart of a method for authenticating a text message sent by a text messaging system to a text messaging application, according to an illustrative embodiment.

FIG. 4 is a flowchart 400 of a method for authenticating a text message sent by a text messaging system to a text messaging application, according to an illustrative embodiment. In some embodiments, the method is implemented using the system 300 of FIG. 3. The method includes receiving 404 a text message at a text messaging hub (e.g., text messaging hub 340 of FIG. 3) from a user directed to a specific number associated with the text messaging hub. The specific number is one of a plurality of possible numbers associated with the text messaging hub, where the text message includes a user number.

The method also includes determining 408 if the text message is authentic (using, for example, the authentication module 374 of FIG. 3) based on whether the user number is associated with the specific number based on a set of stored authorized user number/specific number pairs. In some embodiments, the step of determining 408 if the text message is authentic includes comparing 424 the user number and specific number with stored data. The text message is authenticated if the user number is associated with the specific number and fails authentication if the user number is not associated with the specific number. In some embodiments, the specific number of the authorized user number/specific number pairs is not stored; rather, the specific number is calculated using a hash method based on the user number and a key.

The method includes sending 412 the text message to a text messaging application in response to authentication of the text message and sending 416 a notification message (e.g., text message or e-mail message) to the user if not authenticated (i.e., is not a message from the actual user associated with the user number, but, instead is a message sent by a third party who misrepresents his/her identity). In some embodiments, a notification text message is sent to the user at the user number in response to failing authentication of the text message. The notification text message can include information instructing the user to direct text messages to the user-specific system number. In some embodiments, the notification text message includes information informing the user a non-authenticated text message purporting to be from the user number was sent to the text messaging hub.

The method also includes the optional step of assigning 420 a new user-specific system number for the user to use in subsequent communications. In some embodiments, the method includes sending a notification text message to the user at the user number in response to failing authentication of the text message. The notification text message can include the second, newly-assigned user-specific system number.

In some embodiments, the method includes notifying the user a third party may be attempting to spoof the account of the user in response to receiving non-authenticated text messages that do not satisfy a criterion. Evidence of a large number of text messages being sent may be interpreted as evidence an unauthorized user is attempting to send text messages. By setting a limit on the number or rate of text messages sent (broadly, "rate limiting guess criterion") the system may determine a third party is attempting to spoof the users account. In some embodiments, a notification is sent to the user when a quantity of non-authenticated text messages directed to the user number and received by the text messaging hub exceeds a predetermined threshold. For example, the method may include determining a third party is attempting to spoof the users account when it is determined a party is sending more than 10 text messages per minute, more than 60 text messages in less than one hour or more than 200 text messages in one day.

In some embodiments, the step of determining if the text message is authentic includes determining if a pin is included in the text message. The pin can be used as an extra level of security in authenticating the user's text message communications, similarly as employed in other computer software applications. In some embodiments, the pin is assigned to the user when the user logs into a secure web portal interface.

In some embodiments, once a provider decides to change the user-specific system number, the provider can send text message to the user from the new user-specific system number telling them that from now on they should send commands to this number. Should the user ignore/forget/not receive the message, the next time they send a command to the old user-specific system number the provider can send a reply to the user reminding them to send the commands only to the new user-specific system number.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site or at multiple sites.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

The system can include clients and servers. A client and a server are generally remote from each other and typically interact through a communication network. The relationship of client and server arises by virtue of computer programs running on the respective computers and having a client-server relationship to each other.

The devices described can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Chrome browser available from Google Inc., Mozilla® Firefox available from Mozilla Corporation). The mobile computing device includes, for example, an Android-based smart phone or mobile phones lacking advanced features.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for establishing credentials for securing text message communications, the method comprising:
    receiving, at a text messaging hub executing at a server device, from a device, a first text message, the first text message being directed to a service number and including a user number and a request to establish a secure credential for communicating with a text messaging application via the text messaging hub;
    transmitting, by the text messaging hub executing at the server device, to the device, an initiation message including a user-specific system number to which the device is to direct future text messages;
    receiving a second text message that includes the user number;
    determining that the second text message is not authentic in response to determining the second text message is not directed to the first user-specific system number; and
    transmitting, by the text messaging hub executing at the server device, to the device, a notification message that includes a second user-specific system number to which the device is to direct future text messages in response to determining the second text message is not authentic, the second user-specific system number being different from the first user-specific system number.

2. The method of claim 1, wherein the initiation message is directed to the device at the user number.

3. The method of claim 1, wherein the initiation message is sent to the device at a pre-approved e-mail address, a web portal software application, or other communication form associated with the device.

4. The method of claim 1, wherein the request includes text.

5. A system for establishing credentials for securing text message communications, the system comprising:
    a processor, and
    a memory, the memory including code representing instructions that when executed cause the processor to:
        receive, from a device, a first text message, the first text message being directed to a service number, wherein the first text message includes a user number and a request to establish a secure credential for communicating with a text messaging application;
        transmit, to the device, an initiation message including a first user-specific system number to which the device is to direct future text messages;
        receive a second text message that includes the user number;
        determine that the second text message is not authentic in response to determining the second text message is not directed to the first user-specific system number; and
        transmit, to the device, a notification message that includes a second user-specific system number to which the device is to direct future text messages in response to determining that the second text message is not authentic, the second user-specific system number being different from the first user-specific system number.

6. The system of claim 5, comprising a receiver module for receiving the first text message and a transmitter module for transmitting the initiation message, wherein one or both of the receiver module and transmitting module are a component of a text messaging hub executing at a server device.

7. The system of claim 5, wherein the processor is configured to direct the initiation message to the device at the user number.

8. The system of claim 5, wherein the processor is configured to direct the initiation message to the device at a pre-approved e-mail address, a web portal software application, or other communication form associated with the device.

9. The method of claim 1, wherein the request does not include text in a body of the request.

10. A method comprising:
    receiving, by a text messaging hub executing at a server device, a sign-up request, the sign-up request including a user number for a user, the user number for the user including a phone number for the user;
    responsive to receiving the sign-up request:
        assigning, by the text messaging hub, a first user-specific system number to which a mobile device is to direct future text messages, the mobile device being associated with the phone number for the user, wherein assigning the first user-specific system number comprises storing the first user-specific system number and the phone number for the user to a set of authorized user number and specific number pairs, the first user-specific system number being different from the phone number for the user; and
        sending, by the text messaging hub to the mobile device associated with the phone number for the user, an initiation message, the initiation messaging including the first user-specific system number;
    receiving, by the text messaging hub, a text message from a device, the text message being directed to a specific number associated with the text messaging hub, wherein the specific number is one of the plurality of possible numbers associated with the text messaging hub, the text message including the phone number for the user;

determining, by the text messaging hub, whether the phone number for the user is associated with the specific number based on the set of authorized user number and specific number pairs, wherein the phone number for the user is not associated with the specific number when the specific number to which the message is directed is not the first user-specific system number;

determining, by the text messaging hub, that the text message is not authentic in response to determining the phone number for the user is not associated with the specific number; and responsive to determining that the text message is not authentic:
assigning, by the text messaging hub, a second user-specific number to which the mobile device is to direct future text messages; and
sending, by the text messaging hub, to the mobile device at the phone number for the user, a notification text message that includes the second user-specific number.

11. The method of claim 10, further comprising:
forwarding, by the text messaging hub executing at the server device, the text message to a text messaging application in response to determining that the text message is authentic.

12. The method of claim 10, wherein the notification text message includes information instructing the device to direct text messages to the second user-specific number.

13. The method of claim 10, wherein the notification text message includes information informing the device that a non-authenticated text message purporting to be from the phone number for the user was sent to the text messaging hub.

14. The method of claim 10, further comprising:
in response to determining that the text message is not authentic, sending, to the device at the phone number for the user, by the text messaging hub executing at the server device, a notification indicating that a third party may be attempting to spoof an account of the device at the phone number for the user.

15. The method of claim 10, wherein the determining whether the text message is authentic includes determining whether a personal identification number is included in the text message.

16. The method of claim 10, wherein the set of authorized user number and specific number pairs are stored at a memory operatively coupled to the server device.

17. The method of claim 14,
wherein determining that the message is not authentic is based at least in part on a rate-limiting criterion, and
wherein the text messaging hub sends the notification when a quantity of non-authenticated text messages directed to the phone number for the user and received by the text messaging hub exceeds a predetermined threshold.

18. A system comprising:
a text messaging hub comprising a processor and a memory that stores instructions that when executed cause the processor to:
receive a sign-up request, the sign-up request including a user number for a user, the user number for the user including a phone number for the user;
responsive to receiving the sign-up request;
assign a first user-specific system number to which a mobile device is to direct future text messages, the mobile device being associated with the phone number for the user, wherein assigning the first user-specific system number comprises storing the first user-specific system number and the phone number for the user to a set of authorized user number and specific number pairs, the first user-specific system number being different from the phone number for the user; and
send an initiation message to the mobile device associated with the phone number for the user, the initiation messaging including the first user-specific system number;
receive a text message from a device, the text message being directed to a specific number associated with the text messaging hub, wherein the specific number is one of the plurality of possible numbers associated with the text messaging hub, the text message including the phone number for the user;
determine whether the text message is authentic based on whether the phone number for the user is associated with the specific number based on the set of authorized user number and specific number pairs, wherein the phone number for the user is not associated with the specific number when the specific number to which the message is directed is not the first user-specific system number, determine that the text message is not authentic in response to determining the phone number for the user is not associated with the specific number; and
responsive to determining that the text message is not authentic:
assign a second user-specific system number to which the mobile device is to direct future text messages; and
send, to the mobile device at the phone number for the user, a notification text message that includes the second user-specific system number.

19. The system of claim 18, further comprising:
a receiver module for receiving the text message; and
an authentication module for determining whether the text message is authentic, wherein one or both of the receiver module and a transmitting module are a component of the text messaging hub.

20. The system of claim 18, wherein the instructions further cause the processor to:
authenticate the text message when the phone number for the user is associated with the first user-specific system number.

21. The system of claim 18, wherein the instructions further cause the processor to:
forward the text message to a text messaging application when the text message is determined to be authentic.

22. The system of claim 18, wherein the notification text message includes information instructing the device at the phone number for the user to direct text messages to the second user-specific phone number.

23. The system of claim 18, wherein the notification text message includes information informing the device at the phone number for the user that a non-authenticated text message purporting to be from the phone number for the user was sent to the text messaging hub.

24. The system of claim 18, wherein the instructions further cause the processor to:
in response to receiving multiple text messages that do not satisfy a predetermined criterion, send, to the device at the phone number for the user, a notification that a third party may be attempting to spoof an account of the device at the phone number for the user.

25. The system of claim 18, wherein the set of authorized user number and specific number pairs are stored at the memory.

26. The system of claim 24, wherein the criterion is a rate-limiting criterion and the instructions further cause the processor to:
 send, to the device, the notification when a quantity of received, non-authenticated text messages directed to the phone number for the user exceeds a predetermined threshold.

\* \* \* \* \*

UNITED STATES PATENT AND TRADEMARK OFFICE
CERTIFICATE OF CORRECTION

PATENT NO. : 9,998,919 B1  
APPLICATION NO. : 13/361192  
DATED : June 12, 2018  
INVENTOR(S) : Dror Michael Marcus et al.

Page 1 of 1

It is certified that error appears in the above-identified patent and that said Letters Patent is hereby corrected as shown below:

In the Claims

Column 11, Claim 1, Line 42: replace "user-specific system number" with --first user-specific system number--

Column 13, Claim 10, Line 21: replace "specific number" with --specific system number--

Column 13, Claim 12, Line 29: replace "user-specific number" with --user-specific system number--

Signed and Sealed this  
Twelfth Day of March, 2019

Andrei Iancu  
*Director of the United States Patent and Trademark Office*